United States Patent [19]
Miyagawa et al.

[11] Patent Number: 5,789,095
[45] Date of Patent: Aug. 4, 1998

[54] METHOD OF RECOVERING USEFUL MATERIALS FROM SPENT SECONDARY BATTERIES FOR ELECTRIC VEHICLES

[75] Inventors: Hiroshi Miyagawa; Ryouichi Shirai, both of Ageo, Japan

[73] Assignee: Mitsui Mining & Smelting Co., Ltd., Tokyo, Japan

[21] Appl. No.: 714,461

[22] Filed: Sep. 16, 1996

[30] Foreign Application Priority Data

Oct. 26, 1995 [JP] Japan .................. 7-278725

[51] Int. Cl.⁶ .................................. H01M 10/54
[52] U.S. Cl. ............................. 429/49; 29/730
[58] Field of Search .................. 241/19, 24.14, 241/24.13, 24.15; 429/49; 29/801, 729, 730, 731; 83/903

[56] References Cited

U.S. PATENT DOCUMENTS

| | | | |
|---|---|---|---|
| 1,526,714 | 2/1925 | Luthy | 429/49 |
| 2,046,490 | 7/1936 | Schuirmann | 429/49 |
| 2,825,125 | 3/1958 | Smith | 429/49 |
| 3,561,684 | 2/1971 | Fischer | 241/42 |
| 3,614,003 | 10/1971 | Tremolada | 241/79.3 |
| 3,841,916 | 10/1974 | Marchetti | 429/49 |
| 4,775,107 | 10/1988 | Heng et al. | 241/23 |
| 5,491,037 | 2/1996 | Kawakami | 429/49 |
| 5,575,907 | 11/1996 | Lindermann | 205/580 |

*Primary Examiner*—Kathryn L. Gorgos
*Assistant Examiner*—Carol Chaney
*Attorney, Agent, or Firm*—Flynn, Thiel, Boutell & Tanis, P.C.

[57] ABSTRACT

The method of recovering useful materials from spent secondary batteries for electric vehicles comprises a step of separating spent secondary batteries for electric vehicles into a cover portion and a housing portion, a step of taking out electrode plates to separate them from the housing portion, a step of disassembling electrode plates into positive electrode plates and negative electrode plates, and a step of cutting the pole section so that the positive electrode plates can be separated from the negative electrode plates.

4 Claims, 5 Drawing Sheets

METHOD OF RECOVERING USEFUL MATERIALS FROM SPENT SECONDARY BATTERIES FOR ELECTRIC VEHICLES

FIELD OF THE INVENTION

The present invention relates to a method of disassembling spent nickel metal-hydride batteries, spent nickel-cadmium batteries or the like, preferably used as a second battery for, for instance, electric vehicles and recovering useful materials such as plastics, metals, positive electrode plates, negative electrode substrates, nickel compounds and active materials.

BACKGROUND OF THE INVENTION

As secondary batteries for electric vehicles, the possibility of using lithium ion batteries, nickel metal-hydride batteries, nickel-cadmium batteries, and lead batteries or the like is now under examination, and especially lithium ion batteries and nickel metal-hydride batteries are promising because these types of batteries have an excellent high output density, long service life, and high energy density, all of which are indispensable requirements for an electric vehicle. In this case, a large quantity of spent secondary batteries is discarded, but as they include useful metals such as hydrogen-absorbed alloys (active material of negative electrode), nickel, and cadmium, processing for recycling these spent secondary batteries is quite important.

As an example of processing for recycling spent secondary batteries, there has been proposed a method of recovering useful metals from spent nickel metal-hydride secondary batteries (Refer to Japanese Patent Laid-Open Publication No. 340930/1994). This recovering method comprises a step of pulverizing spent nickel metal-hydride batteries; a step of removing alkali, organic materials, and ferric or ferrous metals therefrom; either one of (a) a step of sintering the recovered materials, (b) a step of dissolving the recovered materials in mineral acid and then precipitating, filtering, and sintering rare earth metallic ions, and nickel ions, and (c) a step of dissolving the recovered materials in a mineral acid, obtaining fluoride rare earth metals by precipitating rare earth metallic ions as fluorides, filtering and sintering the precipitate and also obtaining nickel oxide by precipitating nickel ions from the residual liquid, filtering and sintering the precipitate; and a step of processing the sintered materials obtained through either one of the steps (a), (b), (c) or through all the steps (a), (b), (c) by the molten salt electrolytic method.

By the way, in the recovery method based on conventional technology, spent nickel metal-hydride batteries are pulverized together with the plastic cases by a two-shaft shearing pulverizer into small pieces. Because of this step, disassembly and the recovery of plastic pieces can not successfully be performed and, in addition, a complicated step for recovering useful metals such as nickel and hydrogen-absorbed alloys is required, and in any processing flow there exist technologically difficult problems and the recovery efficiency is low.

OBJECT AND SUMMARY OF THE INVENTION

An object of the present invention is to provide a simpler and easier method of recovering useful materials from spent secondary batteries for electric vehicles, which can solve the problems as described above, in which disassembly of the spent batteries is executed according to a last-come-first-processing steps to those of assembling the product, which can maintain a high recovery ratio for each material and also can recover useful materials such as plastics, metals, positive electrode substrates, nickel compounds and active materials of negative electrode separately with a high yield respectively, and also which is based on careful considerations for the prevention of combustion due to residual energy or hydrogen-absorbed alloys in the spent batteries during the pulverizing process and is extremely safe when viewed from a view point of security.

To achieve the object as described above, the useful material recovery method according to the present invention is characterized in that the method comprises a step of cutting each spent secondary batteries for electric vehicles into a cover portion and a housing portion, a step of taking out electrode plates from the housing portion to separate the electrode plates from the housing portion, a step of disassembling the electrode plates into positive electrode plates and negative electrode plates, and a step of cutting a polar pole section so that the positive electrode plates can be separated from the negative electrode plates.

Also, the useful material recovery method according to the present invention is characterized in that the method comprises, in addition to the steps described above, a step of crushing the negative electrode plate as a preprocessing step of removing a separator enclosing the negative electrode plate, and a step of pneumatic separation and sieving for separating the crushed materials into a negative electrode plate, active materials, and a separator, making use of the difference in specific gravity and size between each material.

Furthermore, the useful material recovery method according to the present invention is characterized in that the method comprises, in addition to the steps described above, a step of separating deposited active materials of the negative electrode from the negative electrode plate.

According to one embodiment of the present invention, in the step for separating a cover portion from the housing portion, after a connection metal fitting connecting batteries in a spent secondary battery for electric vehicles is removed, the work of separating the cover portion from the housing portion is performed module by module. Also, in the step for separating the positive electrode plates from the negative electrode plates, the positive electrode plates and the negative electrode plates assembled into one piece are disassembled by an air jet flow in water, and the positive electrode plates and negative electrode plates are pulled away in opposite directions and collected into bundles respectively.

With the useful material recovery method according to the present invention, disassembly of the spent batteries is performed according to last-come-first-processed steps to the production process sequence as described above, the processing sequence can be made simpler and easier as compared to that based on conventional technology, and useful materials such as plastics, metals, positive electrode plates, negative electrode plates, and materials of the negative electrode can be recovered separately with a high yield. Also, as countermeasures are taken for prevention of combustion due to residual energy in each battery and hydrogen-absorbed alloy from each battery, the method is extremely safe from the view point of security.

BRIEF DESCRIPTION OF THE INVENTION

DETAILED DESCRIPTION OF THE PREFERRED EMBODIMENTS

Figure 1:
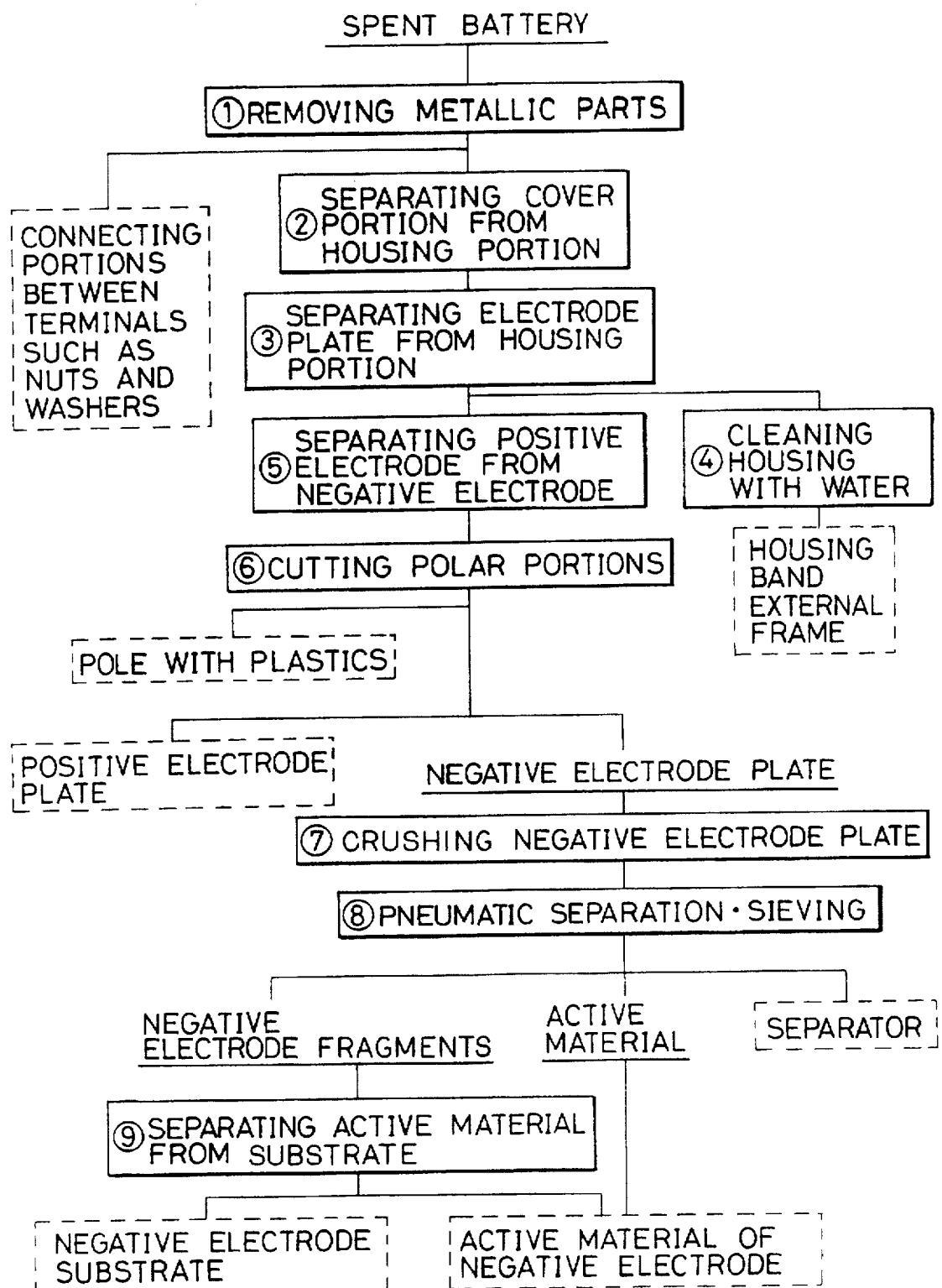
FIG. 1 is a processing flow for separating positive electrode plates from negative electrode plates in a method of recovering useful materials from spent nickel metal-hydride secondary batteries for electric vehicles according to a preferable embodiment of the present invention.

Next, description is made of each step for disassembling a spent battery according to the flow shown in FIG. 1.

Figure 2:
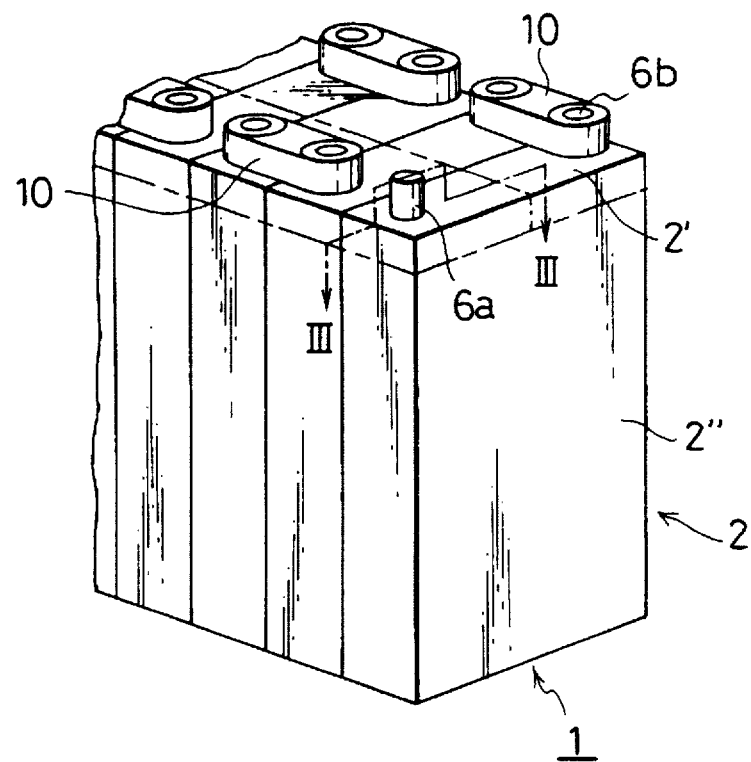
FIG. 2 is a partial perspective view showing spent batteries from a nickel metal-hydride secondary batteries with only a portion (4 batteries in the figure) of one module (10 batteries).
Figure 3:
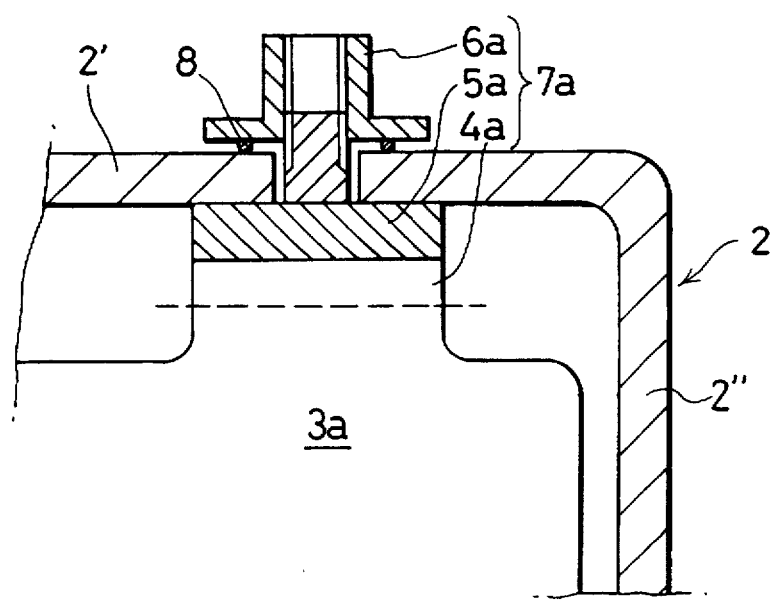
FIG. 3 is a partial enlarged cross-sectional view taken along the line III—III in FIG. 2.

As shown in FIG. 2 and FIG. 3, a spent battery 1 incorporates positive and negative electrode plates 3a (3b) in a plastic case 2. Each of the positive and negative electrode plates 3a (3b) has an electrode plate lead section 4a (4b), the lead section is connected via a lead collecting plate 5a (5b) to a terminal 6a (6b), and the terminal 6a (6b)projects from a top surface of the case 2. The electrode plate lead section 4a (4b), lead collecting plate 5a (5b) and terminal 6a (6b)form a pole section 7a (7b). The reference numeral 8 indicates an O ring. Terminals 6a (6b)of each battery are connected with connecting metal parts not shown herein and covered with a terminal cover 10. The connecting metal parts are covered by the terminal cover 10 and can not be seen in the figure.

1) Operation for removing metallic parts

This is a step for removing the terminal cover 10 from the spent battery 1 shown in FIG. 2 and then removing the connecting metal parts between the terminals 6a (6b). This work is manually carried out module by module. The removed connecting metal parts, such as nuts and washers, etc., are carried outside of the system.

2) Operation for cutting cover portion and housing portion (Step for dividing a spent battery into a cover portion and a housing portion)

Figure 4A:
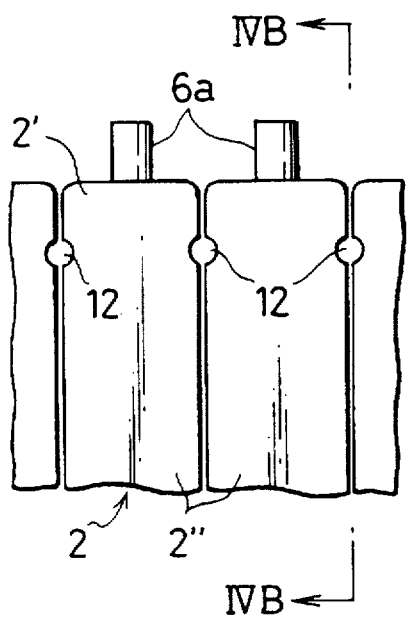
FIG. 4A is a partial front view illustrating a step of cutting the cover portion and housing portion.
Figure 4B:
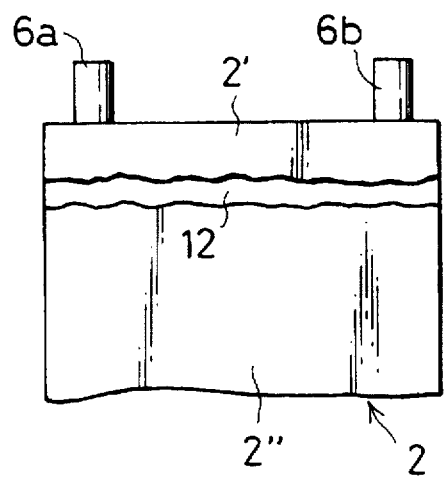
FIG. 4B is a side view taken along the line IV B—IV B in FIG. 4A.

This is a preprocessing step for taking out electrode plates and separating positive electrode plates from negative electrode plates. At first, as shown in FIG. 4A and FIG. 4B, the spent battery 1 is fixed, and a section where the batteries contact each other is cut with a drill-shaped cutter module by module. The reference numeral 12 indicates the cut section. Various tests were carried out to determine the optimal drill diameter, and it was found out that a drill diameter of around 10 mm is optimal. Then the outer peripheral section and the upper central portion connected to the cut position are cut off with a saw-shaped cutter as indicated by the dashed line in FIG. 2.

Figure 5:
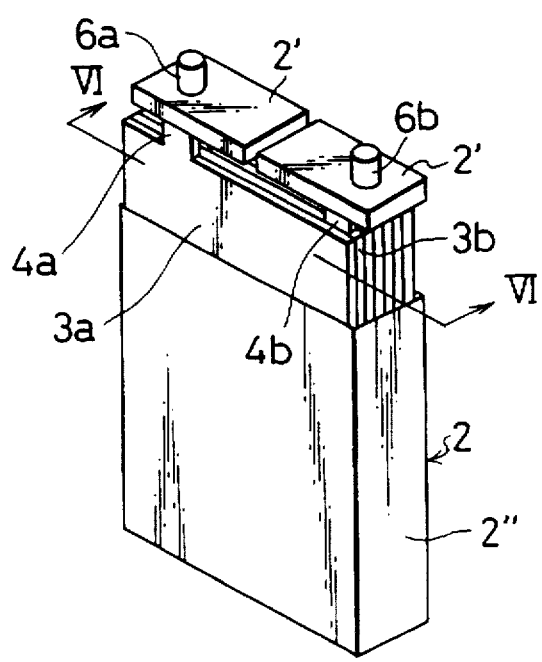
FIG. 5 is a perspective view showing a state where an upper section of a plastic case for a spent battery is exposed and the positive and negative electrode plates contained therein can be seen from the outside.
Figure 6:
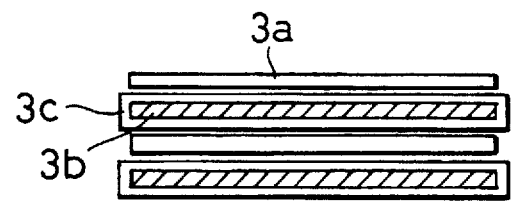
FIG. 6 is a transverse top view showing a portion along the line VI—VI in FIG. 5.

With the operations described above, as shown in FIG. 5, an upper section of the plastic case 2 of the spent battery 1 is exposed, and the positive and negative electrode plates contained therein can be seen from the outside. Designated at the reference numeral 3a is a positive electrode plate, at 3b a negative electrode plate, at 6a a positive terminal, and at 6b a negative terminal, and the negative electrode plate 3b is enclosed by a separator 3c as shown in FIG. 6. The reference numeral 2' indicates positive and negative cover portions separated at the central position. FIG. 6 shows the positional relationship between the negative electrode plate 3b and the positive electrode plate 3a, each being enclosed by the separator 3c, and as shown in this figure, they are located so that they are disposed alternatingly. FIG. 6 shows only a portion thereof.

It should be noted that the positive electrode plate 3a is manufactured by appropriately mixing a polyacrylic salt, such as carboxymethyl cellulose and polyacrylic soda and nickel hydroxide and a material such as $Co(OH)_2$, $CoO$, and metallic cobalt, if necessary, to prepare a nickel compound, filling the nickel compound in a substrate having a three-dimensional structure such as a foamed metal substrate, a meshed sintered textile substrate, or a felt-plated substrate with non-woven fabric metal plated thereon, drying the substrate, and executing roller pressing thereto. The negative electrode plate 3b is manufactured by mixing a metal-hydride alloy powder, high molecular weight binding agent and conductive agent, added if necessary, to prepare an active material, and applying and coating it on a conductive substrate as an electric charge collector, drying it, and executing roller pressing thereto. The separator 3c is made from a textile of a single substance textile such as nylon, polypropylene, polyethylene, or a hybrid textile obtained by way of a mixed spinning of these high molecular weight fibers.

3) Operation for separating electrode plates from a housing portion (Step for dividing spent batteries to electrode plates and the housing portion)

Figure 7:
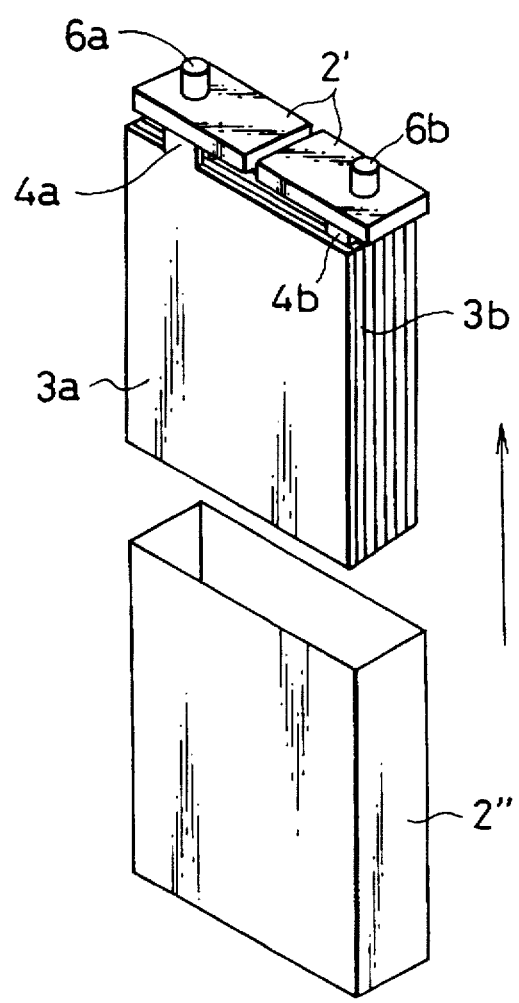
FIG. 7 is a perspective view showing a state where electrode plates have been taken out from the housing portion.

This is a step for taking out the electrode plates. The electrode plates 3a, 3b are taken out from the housing portion 2", as shown in FIG. 7, by clamping positive terminals 6a and negative terminals 6b, then fixing the housing portion 2" of the plastic case 2, and then pulling up the clamp.

4) Operation for cleaning a housing portion with water

Potassium hydroxide is used in a battery, so that the inside of the battery is in a high alkali state. Therefore, the electrode plates are first cleaned with water for safety in handling. After an external frame is removed from the housing portion 2", the inside of the housing portion is cleaned with water. The housing, band, and external frame, after having been cleaned with water, are carried outside of the system. The water used for cleaning is neutralized and replaced with fresh water after it is used for a certain period of time.

5) Operation for separating positive electrode plates from negative electrode plates (Step of separating positive electrode plates from negative electrode plates)

Figure 8:
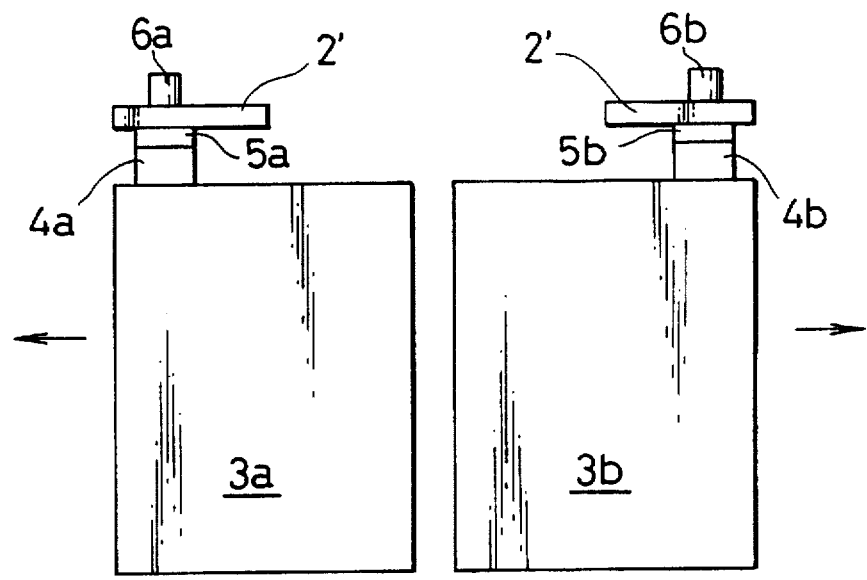
FIG. 8 is a front view showing a state where electrode plates taken out from the housing portion are divided into a bundle of positive electrode plates and a bundle of negative electrode plates.

This is a step for separating positive electrode plates 3a from negative electrode plates 3b so that they are not mixed with each other. Each of the positive electrode plates 3a is not connected to any negative electrode plate 3b, so it is possible to separate any positive electrode plate 3a from the negative electrode plate 3b without cutting them, but 16 sheets of positive electrode plates per battery are connected to the lead collecting plate 5a for the positive electrode plate and 17 sheets of negative electrode plates per battery are connected to the lead collecting plate 5b respectively, and they are in close contact to each other, so that it is impossible to easily separate positive electrode plates from negative electrode plates. Various tests were carried out, and it was found that the work for separating the positive electrode plates from the negative plates should preferably be executed in water to reduce the friction between the electrode plates. The electrode plates 3a, 3b are put in an underwater separator in a state where the space between each plate is a little widened, then an air jet flow is injected to the electrode plates in a direction parallel to each electrode plate so that the connection between the electrode plates is loosened, and then a clamp for the positive electrode plates and a clamp for the negative electrode plates are pulled in opposite directions respectively to separate the positive electrode plates from the negative electrode plates with the separated electrode plates bundled into a group respectively. FIG. 8 shows this state. As described above, since an air jet flow is used for this operation, it is possible to efficiently clean off alkali as a binder between the electrode plates, and also the electrode plates and other portions are not damaged and the effect to subsequent steps can be suppressed to a low level.

6) Operation for cutting a pole portion (Step for cutting a pole portion so that the positive and negative electrode plates can be separated one by one)

Figure 9:
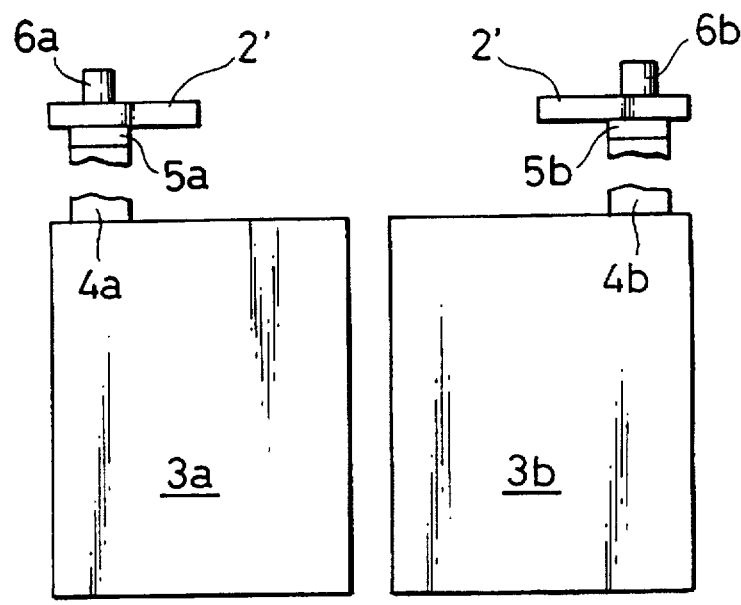
FIG. 9 is a front view showing additional processing to take out other types of spent materials, in addition to the positive and negative electrode plates.

This is a step for separating the materials obtained as a result of step 5) above into positive electrode plates 3a, negative electrode plates 3b, and another portion. Positive and negative electrode plates for each battery are held with the terminal section respectively, and the electrode lead sections 4a, 4b are cut at a cutting position indicated by dotted line in FIG. 3. FIG. 9 shows this state. The pole section is sent to a step for separating plastics from metal outside the system.

7) Operation for crushing negative electrode plates (Step for crushing negative electrode plates)

This is a preprocessing step for removing the separator 3c enclosing each negative electrode plate. Various tests for separating the separator 3c were carried out and it was found out that it is preferable to use a system for crushing the negative electrode plates into small pieces with a low speed (two shaft) shredder. The negative electrode plates 3b, having been crushed into small pieces, are fed at a certain spacing to the low speed (two shaft) shredder.

8) Operation for pneumatically separating and sieving crushed materials (Step for pneumatically separating and sieving crushed materials to divide the materials into negative electrode plates, active materials, and separators)

The materials obtained as a result of step 7) comprise separator 3c, negative electrode plates 3b, and active materials separated from the negative electrode plates, and this step is executed for separating the materials into each group respectively. The separators 3c and negative electrode plates are pieces of several square centimeters, while the separated active materials are powder. The materials are sieved with a rotary sieve of around 10 mm mesh, and dropped active materials pass through the sieve, while the separators 3c on the sieve, having a light weight, are blown away with an air flow, so that only the negative electrode plates 3b remain on the sieve.

9) Operation for separating negative electrode plate substrate from active materials (Step for separating active materials deposited on negative electrode plates from the negative electrode plate substrate)

This is a step for separating active materials deposited on the negative electrode plates 3b separated in Step 8) above from the negative electrode plate substrate. To prevent combustion, the negative electrode plates are put in a wet ball mill, and a surface of each negative electrode plates are impacted with the balls for a specified period of time, thus, active materials having been deposited thereon are separated from the negative electrode plate substrate. On the other hand, in the method of crushing negative electrode plates with a high speed shredder into small pieces and removing the active materials having been deposited thereon, there exists the possibility of combustion, and in the method of heating and separating active materials with a rotary kiln, the active materials are oxidized, so that the recovery step becomes complicated.

What is claimed is:

1. A method of recovering materials from spent secondary batteries used in electric vehicles, said method comprising the steps of:

providing an array of spent secondary batteries, said array comprising a plurality of spent batteries in which adjacent batteries are in sidewall-to-sidewall contact and terminals of the adjacent batteries are electrically connected through connection metal fittings;

removing a terminal cover provided over the connection metal fittings;

removing the connection metal fittings from the terminals of the batteries;

forming a groove through the battery sidewalls which are in contact with each other;

cutting around the periphery of an upper portion of the array of batteries in a manner such that the grooves are intersected by the cutting and form a cover portion and a housing portion for each battery, the cover portion being attached to positive and negative electrode plates contained in the battery at pole portions thereof and each of said negative electrode plates having a separator provided therearound;

separating the cover portion, the electrode plates and the separators from the housing;

separating the positive electrode plates and the negative electrode plates from each other; and cutting the pole portions of the electrode plates to separate the electrode plates and the separators from the cover portion.

2. The method of claim 1, additionally comprising the steps of:

crushing the negative electrode plates and the separators to form fragments of the negative electrode plates, fragments of the separators and powder of an active material provided on the negative electrode plates;

separating the fragments of the negative electrode plates from the fragments of the separators with an airstream; and separating the fragments of the negative electrodes from the powder of the active material by sieving.

3. The method of claim 2, additionally comprising the steps of:

introducing the fragments of the negative electrode plates into a wet ball mill;

impacting the fragments of the negative electrode plates with balls contained in the wet ball mill to remove the active material thereon; and separating the fragments of the negative electrode plates from the removed active material.

4. The method of claim 1, wherein the positive electrode plates are separated from the negative electrode plates by the steps of:

inserting the positive and negative electrode plates into an underwater separator;

providing an airstream directed at said electrode in a direction parallel to the electrode plates; and pulling the positive electrode plates and the negative electrode plates away from each other.

* * * * *